United States Patent Office 3,222,582
Patented Dec. 7, 1965

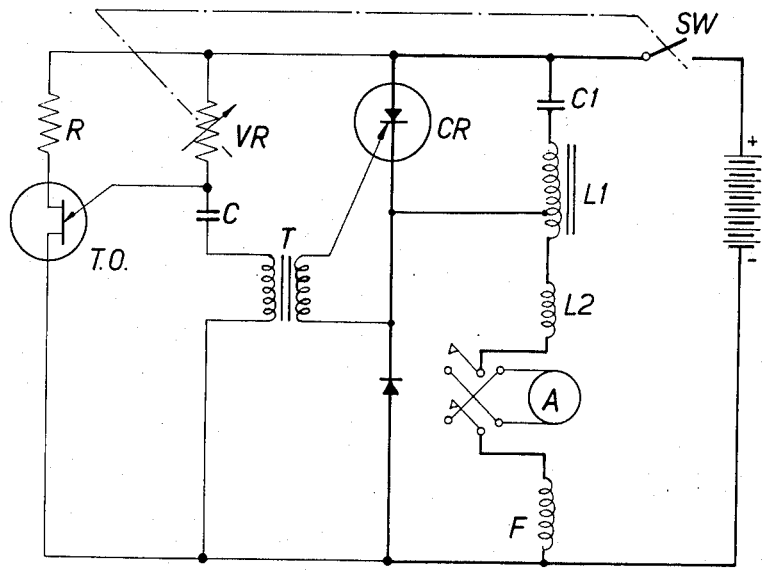
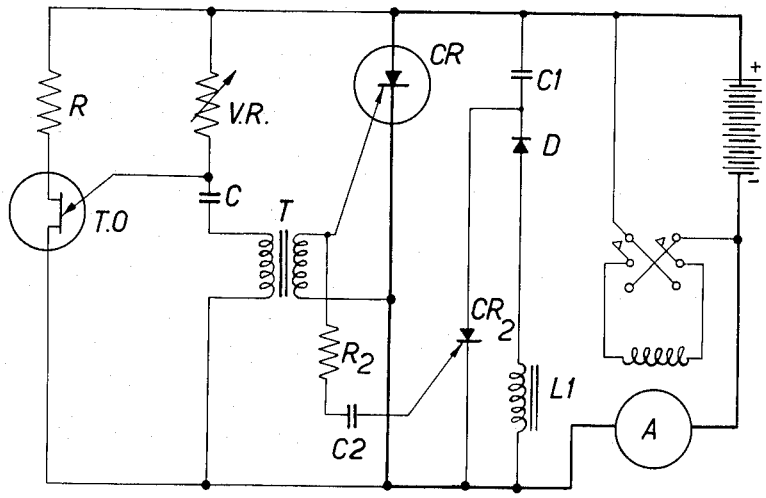

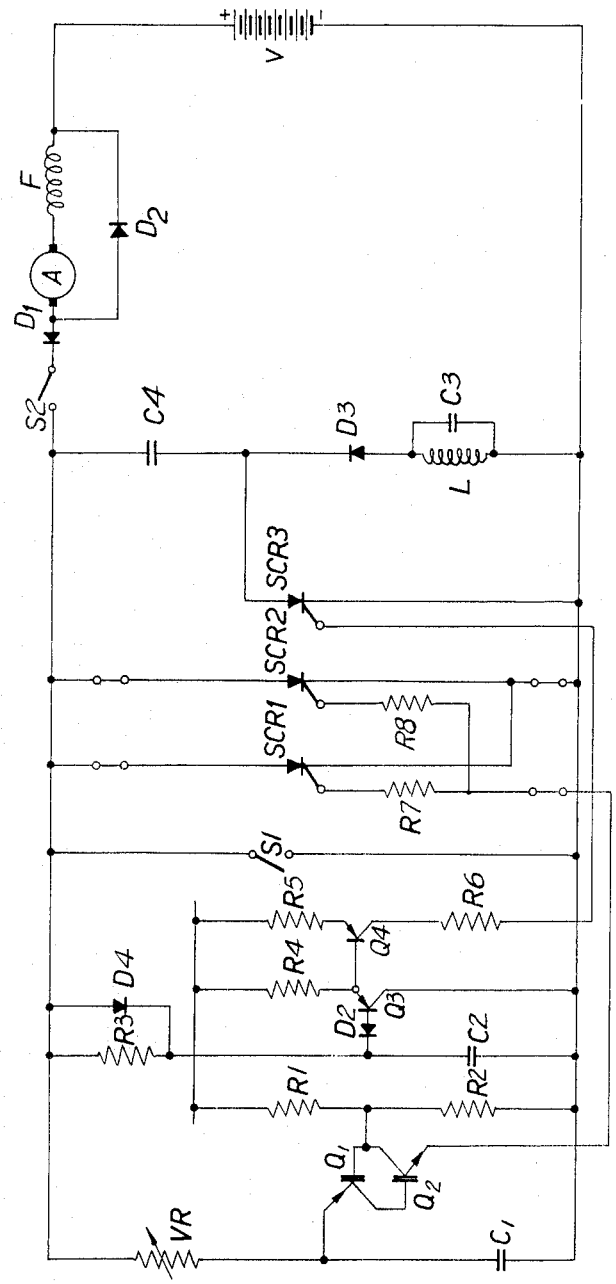

3,222,582
VARIABLE SPEED MOTOR SYSTEM UTILIZING CONTROLLED RECTIFIERS
Horace W. Heyman, Whickham, Newcastle upon Tyne, James Hambleton, Dunston-on-Tyne, Gateshead, and David Gurwitcz, Gosforth, Newcastle upon Tyne, England, assignors to Sevcon Engineering Limited, Gateshead, England, a British company
Filed Aug. 9, 1961, Ser. No. 130,392
Claims priority, application Great Britain, Aug. 20, 1960, 28,893/60; Mar. 11, 1961, 8,975/61
2 Claims. (Cl. 318—139)

This invention is for improvements in or relating to control means for electrical apparatus.

The invention is particularly although not exclusively concerned with control means for electric motors and especially traction motors for electrically propelled vehicles.

Heretofore it has been practice to control electric motors by means of a series and/or parallel arrangement of resistance associated with appropriate contactors or other switchgear. Apart from their complexity and liability to mechanical and electric failure, such arrangements are open to the objection that power is converted into heat in the resistances and wasted. This is particularly objectionable in battery-powered vehicles where it is necesssary to conserve the power available in the batteries to the greatest possible extent. Furthermore, the number of resistances which can be used limits the range of speed variations it is possible to provide.

It is also known to provide a control system for an electrical motor comprising a pulse generator circuit adapted to be inserted between the supply and the apparatus to be controlled, and means for adjusting the pulse frequency or length and thereby the mean power applied to said apparatus. One arrangement particularly applicable to a battery driven electrically propelled vehicle, comprises a transistorised variable frequency pulse generator the pulses from which are used to trigger the gate of a gated (controlled) diode (e.g. a silicon type solid state thyraton) which in turn controls the flow of battery power to the motor or motors. The gated diode is turned off by a reverse inductive voltage which has coincidentally built up through an inductance and a capacitance. This action is repetitive and mean current flow is controlled by the pulse frequency. By this arrangement a control circuit is provided having almost infinite speed variations within the capacity of the motor.

Our invention has for its objects an improvement in the circuit described, to avoid a disadvantage associated with the inductance in the battery leads.

A particular embodiment of the invention will now be described by way of example, with reference to the accompanying diagrammatic drawings in which:

FIGURE 1 shows a known form of circuit,
FIGURE 2 shows a modification of the circuit shown in FIGURE 1,
FIGURE 3 shows a circuit comprising means according to our invention.

Referring to FIGURE 1, this shows an arrangement which comprises a known form of transistorised variable frequency pulse generator having a transistor oscillator T.O. and resistor R, a variable resistor pulse frequency controlled VR and a capacitor C. The pulses from the pulse generator are used, via a coupling transformer T, to trigger the gate of the gated power control diode C.R. (a silicon type solid state thyraton) which in turn controls the flow of battery power to a motor having an armature winding A and a field winding F. The gated diode CR1 is turned off by a reverse inductive voltage which has co-incidentally built up through an inductance and a capacitor circuit $C_1$, $L_1$. This action is repetitive, and current flow is controlled by the pulse frequency. By this arrangement a control circuit is provided having almost infinite speed variations within the capacity of the motor A. $L_2$ is a current limiting inductance. In the case of a battery driven vehicle the variable resistor VR is arranged for operation by the accelerator of the vehicle. The accelerator may also be adapted to operate a master switch SW.

A refinement of the system shown in FIGURE 1 is shown in FIGURE 2. The action is similar except that a rectifier D is provided which allows the current to flow into the charging condenser $C_1$ but prevents it returning by the same path due to the uni-lateral action of the rectifier. A second gated diode CR2 is then triggered, through a time delay circuit $R_2$, $C_2$, a pre-calculated time after the current flow through the power diode CR. This time delay is such that the reverse voltage is at a maximum and a more positive cut-off of the power diode is assured.

A number of power diodes may be connected in parallel to provide for high amperages.

Referring to FIGURE 3, it will be seen that a more detailed circuit similar to FIGURES 1 and 2, is shown. Here, V is the main battery, F and A are the field and armature respectively of the controlled motor, D2 is a bypass surge-absorbing rectifier connected across the motor and S2 is the main starting switch. R6, R7 and R8 are current limiting resistors in the firing electrode circuits of controlled rectifiers SCR1, SCR2 and SCR3. S1 is a switch which is closed only when the motor has reached full load; the switch cuts out the control of the rectifiers by the variable frequency oscillator. VR, C1, Q1 and Q2 are a variable frequency transistor oscillator of known type, as shown and described in application note published by Texas Instruments Incorporated at Dallas, Texas, U.S.A., entitled "turn on" and "turn off" methods for controlled rectifiers, which is fed from a potentiometer R1, R2. R3, D4, C2, D2, Q3 and Q4 form a pulse cut-off delay circuit of known type, and SCR1 SCR2 and SCR3, are controlled rectifiers. SCR1 and SCR2 are the main current-carrying means and SCR3 charges capacitor C4 and turns off the main SCRs. D3, L and C3 are a charge reversing circuit for the capacitor C4. Briefly this circuit acts in known manner by charging the capacitor C4 to battery potential via SCR3 while SCR1 and SCR2 are non-conductive. When SCR1 and SCR2 fire, and SCR3 is extinguished the capacitor discharges through SCR1 and SCR2, the inductance L causing the potential across the capacitor to reverse while the diode D3 prevents discharge of C4 after reversal. When SCR3 re-fires under control of the delay circuit transistor Q4, the potential across the capacitor C4 extinguishes SCR1 and SCR2, and the cycle re-commences, the frequency being determined by the oscillator VR, C1, Q1, Q2, the rate of which is itself determined by the oscillator-pedal resistor VR, while the impulse length is determined by the delay circuit.

However, we find that the inductance of the battery and its associated leads causes an extremely short surge which tends to cancel part of the charge in the capacitor C4 and thus reduce its effectiveness, this effect increasing with motor current or load. We find that this surge can be prevented by the introduction of the diode D1 in series with the motor. This diode is so effective that the previous unwanted effect is reversed i.e. the capacitor extinguishing voltage increases with load. The diode must of course be capable of carrying the full load motor current.

We claim:
1. A control system for a D.C. supplied electric motor comprising a variable frequency pulse generator, a delay circuit, and a circuit including a source of direct current, a variable speed motor with a diode connected in parallel therewith, a diode connected in series between the motor and a capacitor, inductance and rectifier, a first controlled rectifier connected between said diode in series with the motor and the current source return, a second controlled rectifier in parallel with the capacitor, inductance and rectifier, an inter-connection between said variable frequency pulse generator and said first controlled rectifier to control its switching-on frequency and an inter-connection between said delay circuit and said second controlled rectifier to determine the length of the current pulses passed by said first controlled rectifier.

2. A control system for a battery-supplied electric motor comprising a transistor pulse generator having a manually variable resistance controlling the pulse generation frequency, a delay circuit with transistors, a main circuit including a battery, a variable speed motor, a diode connected in parallel therewith, a diode in series therewith, and a first controlled rectifier; a parallel path across said controlled rectifier comprising a capacitor and an inductor, and a second controlled rectifier connected across the inductor, an inter-connection between said pulse generator and first controlled rectifier to control the pulse frequency thereof, and an inter-connection between said delay circuit, and said second controlled rectifier to determine the pulse length.

References Cited by the Examiner

UNITED STATES PATENTS

| | | | |
|---|---|---|---|
| 2,935,671 | 5/1960 | Ross | 318—354 X |
| 2,995,690 | 8/1961 | Lemon | 318—138 |
| 3,040,270 | 6/1962 | Gutzwiller. | |
| 3,064,175 | 11/1962 | Vergez | 318—341 |

OTHER REFERENCES

Publication: Controlled Rectifier, Manual, 1st. ed., General Electric, 1960, pp. 120–122, TK 2798 G4g.

ORIS L. RADER, *Primary Examiner.*

JOHN F. COUCH, *Examiner.*